United States Patent [19]
Cheng

[11] Patent Number: 5,442,976
[45] Date of Patent: Aug. 22, 1995

[54] PEDAL DEVICE WITH TWO-PIECE CLEAT

[75] Inventor: Wen-Heng Cheng, Taichung Hsien, Taiwan

[73] Assignee: Xerama Industrial Co., Ltd., Taichung Hsien, Taiwan

[21] Appl. No.: 180,021

[22] Filed: Jan. 11, 1994

[51] Int. Cl.⁶ .............................................. G05G 1/14
[52] U.S. Cl. .................................... 74/594.6; 36/131
[58] Field of Search ........................... 74/594.6, 594.4; 36/131

[56] References Cited

U.S. PATENT DOCUMENTS

| | | | |
|---|---|---|---|
| 4,864,887 | 9/1989 | Rapisarda | 74/594.6 |
| 5,279,184 | 1/1994 | Ogino | 74/594.6 |

FOREIGN PATENT DOCUMENTS

0402512  12/1990  European Pat. Off. ........... 74/594.6

Primary Examiner—Charles A. Marmor
Assistant Examiner—Mary Ann Battista
Attorney, Agent, or Firm—Christie, Parker & Hale

[57] ABSTRACT

A pedal device includes a front part with a front portion and a rear part with a rear portion that is spaced from the front part by the use of a pair of spring-biased cylinders and a compression spring. The front part has a rearward flat abutting face spaced from the front portion and a bottom surface for abutting a pedal body mounted on a conventional pedal shaft of a bicycle. The rear part has a frontward flat abutting face which is spaced form the rear portion and which faces the rearward flat abutting face of the front part.

4 Claims, 7 Drawing Sheets

PEDAL DEVICE WITH TWO-PIECE CLEAT

BACKGROUND OF THE INVENTION

1. Field of the Invention

This invention relates to a bicycle pedal, more particularly to a pedal device for fastening a cyclist's shoe to a bicycle pedal shaft.

2. Description of the Related Art

Figure 1:
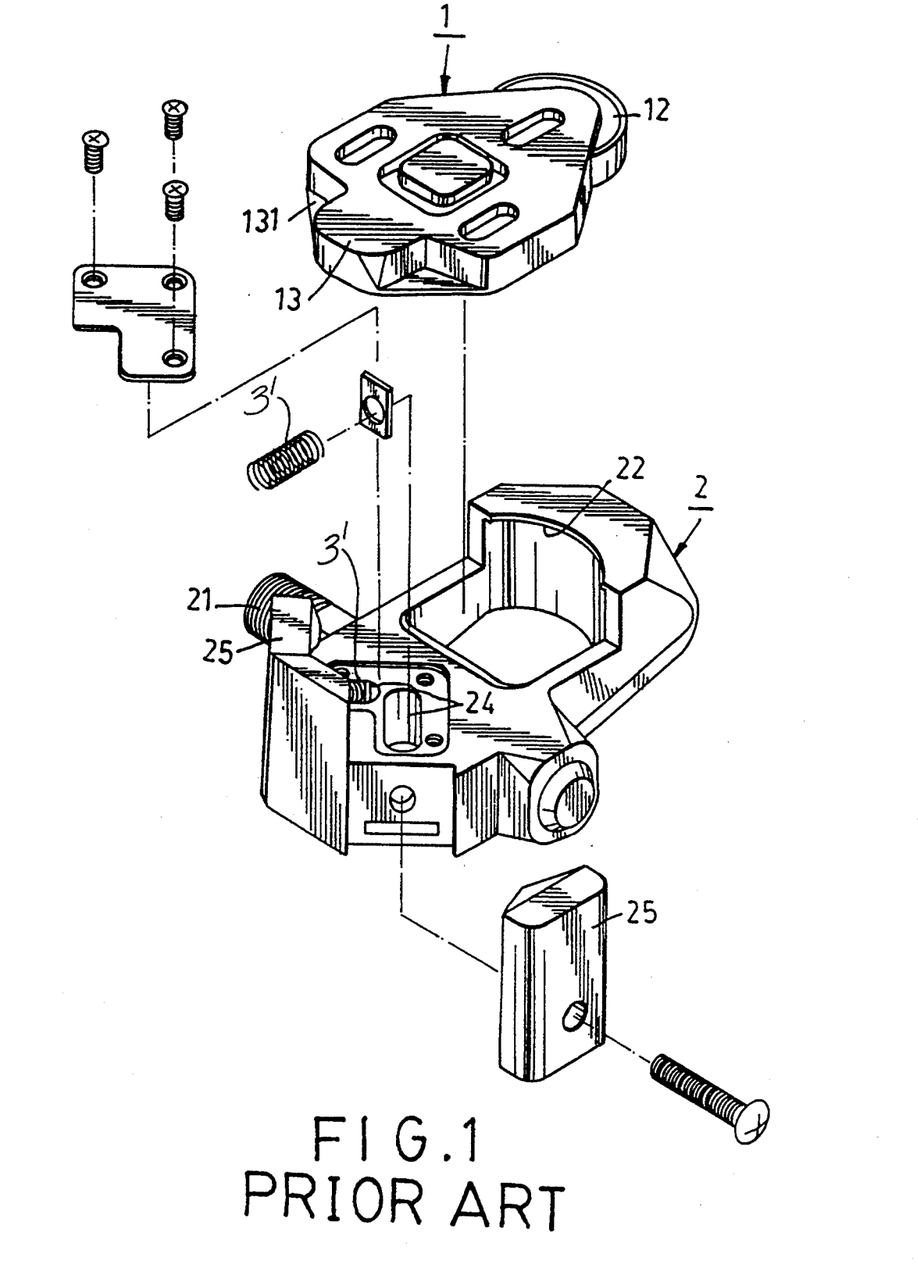
FIG. 1 is an exploded view of a conventional pedal device.
Figure 2:
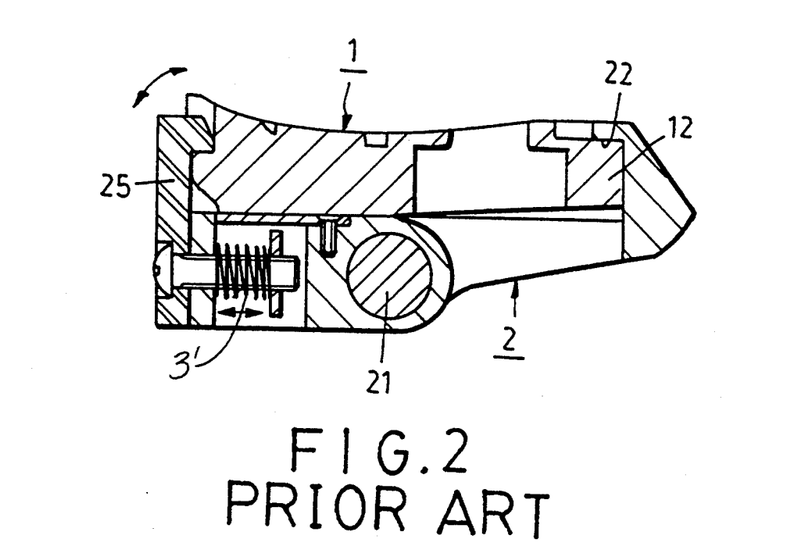
FIG. 2 is a cross-sectional view of the pedal device shown in FIG. 1.

Devices of the type which permit easy positioning and rapid disengagement of a shoe on a pedal without deliberate intervention are known in the prior art. FIGS. 1 and 2 respectively show an exploded and a cross-sectional view of an assembled conventional pedal device that comprises mainly a cleat 1 to be fixed beneath the sole of a shoe and a pedal body 2 to be mounted rotatably on a conventional pedal shaft 21 for retaining the cleat 1. The cleat 1 has a curved insert piece 12 which is received releasably by a claw portion 22 of the pedal body 2 and a substantially curved rear end portion 13 with a pair of curved flanges 131 disposed symmetrically at two sides. The pedal body 2 has a pair of rearwardly movable jaw members 25 which resiliently receive the pair of curved flanges 131 and allow the disengagement of the cleat 1 from the pedal body 2 only when the heel of the foot makes an upward lateral thrust in a direction away from the pedal shaft 21.

A drawback of the above-mentioned pedal device is that only a pair of identical spring members 3' is used to mount the movable jaw members 25 at the rear portion of the pedal body 2. Thus, when the rear end of the cleat 1 is compressed so as to be engaged with the retaining jaw members 25, the retaining jaw members 25 provide weak engagement therebetween.

SUMMARY OF THE INVENTION

A main objective of the present invention is to provide a pedal device that includes a combined cleat which is composed of two parts and which are connected with the use of a pair of identical spring members and another compression spring different from the former so as to provide firm engagement when the combined cleat is engaged on a pedal body of the same.

According to the present invention, the pedal device includes a pedal body with a claw portion, an upright support member spaced from the claw portion and a pair of retaining jaw members disposed fixedly on two sides of the upright support, and a cleat. The cleat includes a front part and a rear part separated from the front part. The front part has an insert piece formed at a front portion, a rearward flat abutting face opposite to the insert piece, an upper face which is formed with a recess, a first blind bore with a predetermined depth which extends from the flat abutting face and which passes through the recess, and a pair of second blind bores which extend from the flat abutting face parallel to the first blind bore and which are disposed on two sides of the first blind bore. The second blind bores have a depth that is shallower than the predetermined depth of the first blind bore. A partition is provided in the recess transverse to the first blind bore to divide the recess into a front chamber adjacent to the insert piece and a rear chamber. A threaded nut is disposed in the front chamber while a compression spring is disposed in the rear chamber. Each of the second blind bores receives a spring-biased cylinder therein. The rear part includes a frontward abutting face which faces the flat abutting face of the front part and a wedge-shaped protrusion forms on a rear end portion of the same. The rear part has a central through-hole which extends therethrough and which is aligned with the first blind bore and a pair of receiving grooves formed in the frontward abutting face. The receiving grooves of the rear part are aligned with the second blind bores so that, when a locking bolt is inserted through the central through-hole of the rear part and is threaded to the threaded nut, the spring-biased cylinders provide biasing action. The first and second parts are thus connected resiliently to one another with the abutting faces being spaced apart at a predetermined gap.

Note that the central through-hole that passes through the wedge-shaped protrusion in the rear part is constricted to receive an enlarged head of the locking bolt. The locking bolt includes a first section which is formed integrally with the enlarged head and which has a cross-section extensible into the first blind bore and a second section extensible through the compression spring. The rear part further has a pair of curved flanges formed symmetrically on both sides of the wedge-shaped protrusion adjacent to a lowermost portion of the same for engaging with the retaining jaw members.

While the combined cleat is engaged in the pedal body, the spring-biased cylinders and the compression spring provide two-step biasing action so as to prevent untimely disengagement from the rear part.

BRIEF DESCRIPTION OF THE DRAWINGS

Other features and advantages of the present invention will become more apparent in the following detailed description of the preferred embodiment, with reference to the accompanying drawings, in which.

DETAILED DESCRIPTION OF THE PREFERRED EMBODIMENT

Figure 3:
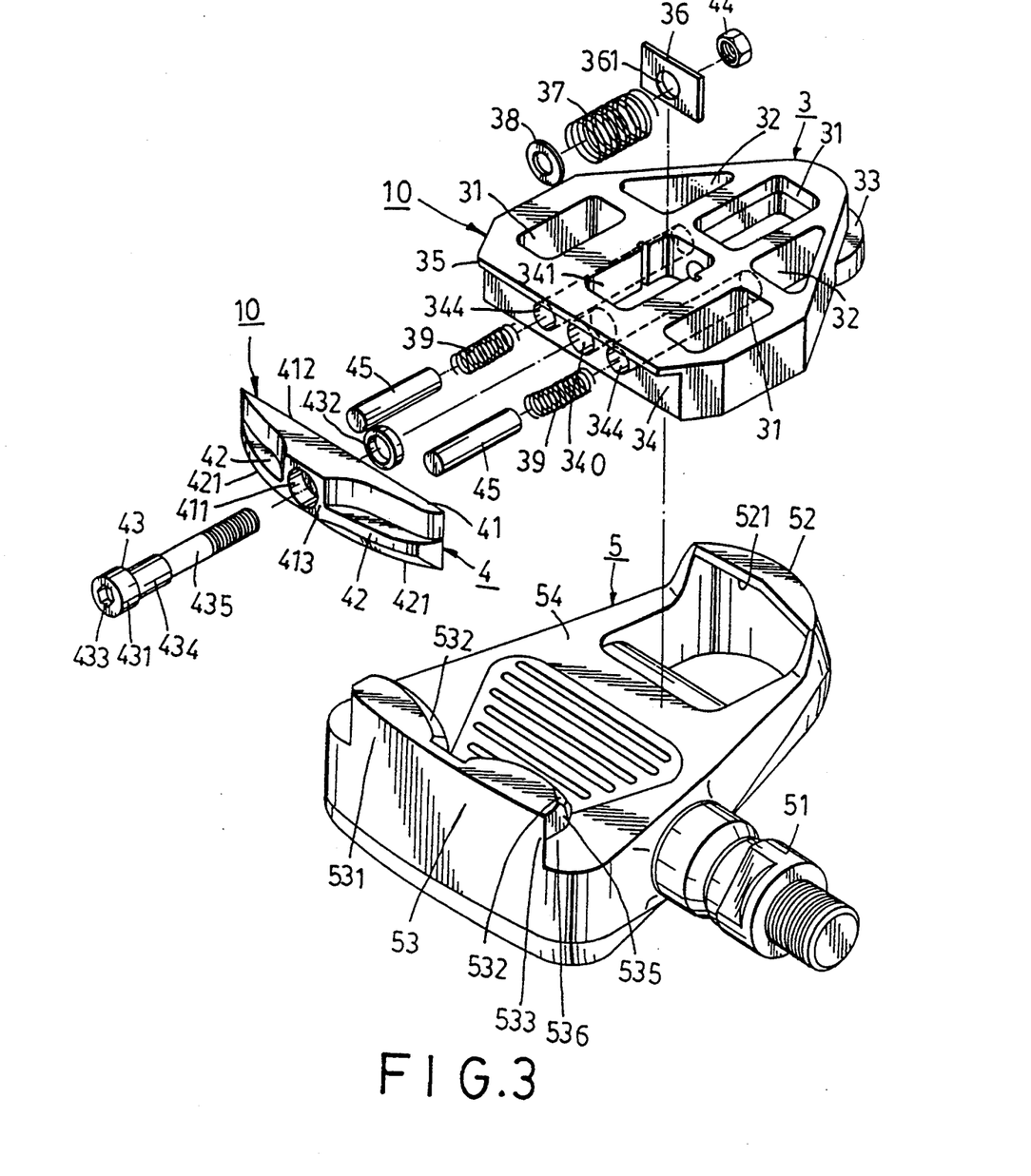
FIG. 3 is an exploded view of a pedal device of the present invention.

Referring to FIG. 3, an exploded view of a pedal device according to the present invention is shown to comprise a pedal body 5, a combined cleat 10, a compression spring 37, a pair of spring-biased cylinders 39, 45 and a locking bolt 43.

The pedal body 5, which is rotatably mounted to a conventional shaft 51, is provided with a fixed claw 52 that forms a concave wall 521 at the front end. The pedal body 5 has a flat receiving surface 54, an upright support member 53 formed at the rear end portion of the same and a pair of retaining jaw members 531 formed integrally with and disposed on two sides of the support member 53. Each of the retaining jaw members 531 includes an upright section 533 which extend upwardly from the flat receiving surface 54 and a projection 535 which extends from the upright section 533 and which is oriented substantially towards the claw 52. The projection 535 is provided with a downwardly inclined face 532, the purpose of which will be explained in the following paragraphs. The projections 535, the upright sections 533 and the flat receiving surface 54 cooperate to define a curved receiving groove 536.

The combined cleat 10, in this embodiment, includes a front part 3 and a rear part 4 which is formed separately from the front part 3. The front part 3, symmetrical about a transverse axis, has a substantially triangular front end portion which is provided with a curved insert piece 33, a substantially rectangular rear end portion that is provided with a flat abutting face 34 and a retaining projection 35 which extends perpendicularly from the flat abutting face 34 in a direction opposite to the front end portion. The front part 3 further has three rectangular holes 31 and two triangular holes 32 for connecting with the shoe sole of a cyclist, a rectangular recess 341 formed in an upper face along the transverse axis, a first blind bore 340 which extends from the flat abutting face 34 toward the front end portion of the same and which passes through the recess 341, and a pair of second blind bores 344 that extend from the flat abutting face 34 parallel to the transverse axis. The second blind bores 344 are disposed on two sides of the first blind bore 340 and respectively have a depth which is shallower than that of the first blind bore 340. A partition wall 36 with a central hole 361 is disposed in the recess 341 to divide the same into a front chamber adjacent to the front end portion and a rear chamber adjacent to the flat abutting face 34. Under this condition, the central hole 361 of the partition wall 36 is aligned with the first blind bore 340. A threaded nut 44 is disposed in the front chamber while a compression spring 37 is disposed in the rear chamber. Each of the second blind bores 344 receives a spring-biased cylinder 39, 45 therein.

Figure 5:
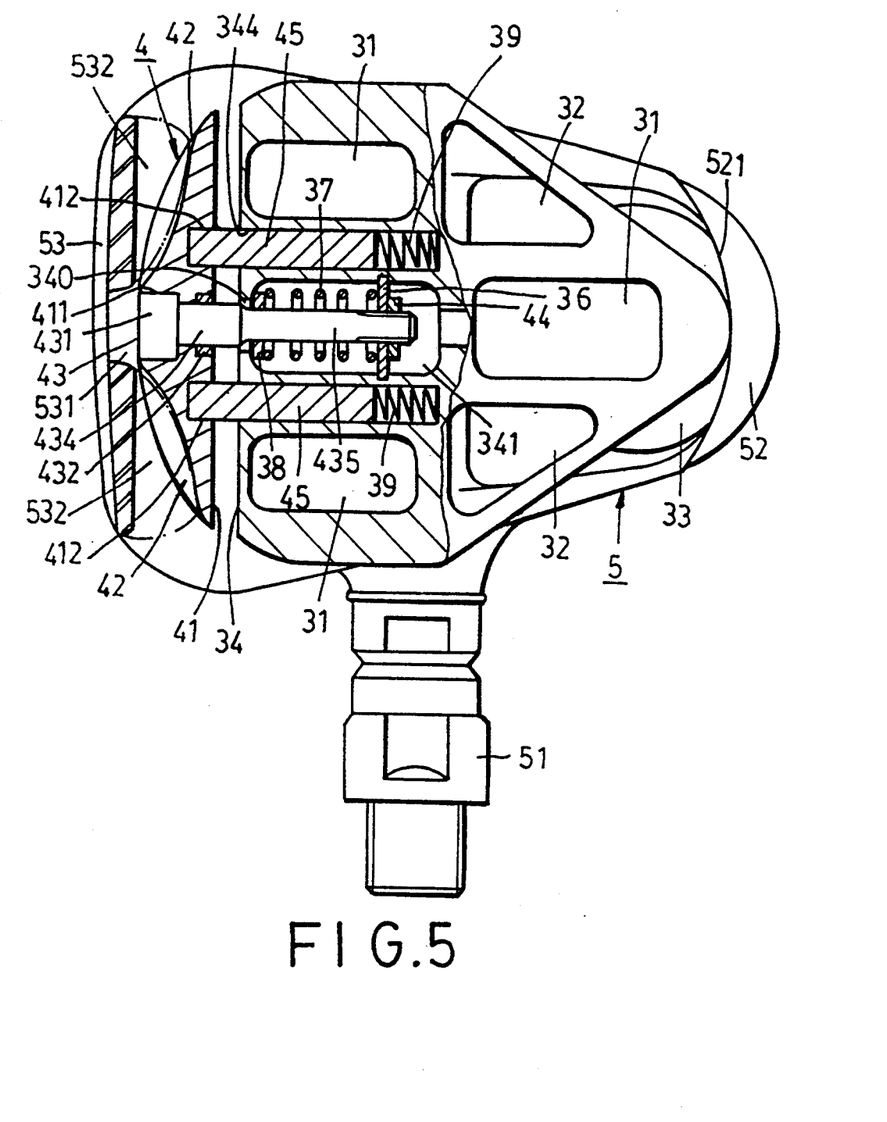
FIG. 5 is a partially cross-sectional view of the pedal device of FIG. 4 taken along the line V—V in FIG. 4, illustrating a condition before the cleat is compressed into the pedal body of the pedal device.

The rear part 4 has a frontward abutting face 41 that faces the rearward flat abutting face of the front part 3, a wedge-shaped protrusion 413 opposite to the abutting face 41 and a pair of curved flanges 42 formed symmetrically on two sides of the wedge-shaped protrusion 413 adjacent to a lowermost portion 421 of the same. The rear part 4 is further provided with a central through-hole 411 which extends through the wedge-shaped protrusion 413 and the abutting face 41 and which is aligned with the first blind bore 340, and a pair of receiving grooves 412 formed in the abutting face 41 on two sides of the central through-hole 411. Since the receiving grooves 412 of the rear part 4 are aligned with the second blind bores 344 of the front part 3, the spring-biased cylinders 45 can be received therein when a locking bolt 43 extends through the central through-holes 411, 340 of the rear part 4 and the partition wall 36 so as to engage threadedly the nut 44. Note that, when thus connected, the abutting faces 34, 41 of the front and rear parts 3, 4 are spaced apart resiliently at a predetermined gap only by biasing action of the spring-biased cylinders 45, as shown in FIG. 5, while the compression spring 37 is at a fully extended condition. The retaining projection 35 of the front part 3 covers the predetermined gap so that it is not visible when viewed from the top.

The locking bolt 43, in this embodiment, has an enlarged head 431, a first section 434 which is formed integrally with the enlarged head 431 and which has a cross section extensible into the first blind bore 340 so as to compress the compression spring 37, and a second section 435 extensible through the compression spring 37. In order to facilitate the compression action on the compression spring 37, a metal washer 38 is sleeved fittingly on the second section 435 of the locking bolt 43. The locking bolt 43 is retained stably through the central through-hole 411 of the rear part 4 by a positioning retaining ring 432 which is disposed in the central through-hole 411 adjacent abutting face 41. The central through-hole 411 in the wedge-shaped protrusion 413 is constricted to receive the enlarged head 431 of the locking bolt 43 such that the locking bolt 43 is flush with the protrusion 413. The enlarged head 431 can be provided with a hexagonal groove 433 to facilitate turning action thereof.

Figure 4:
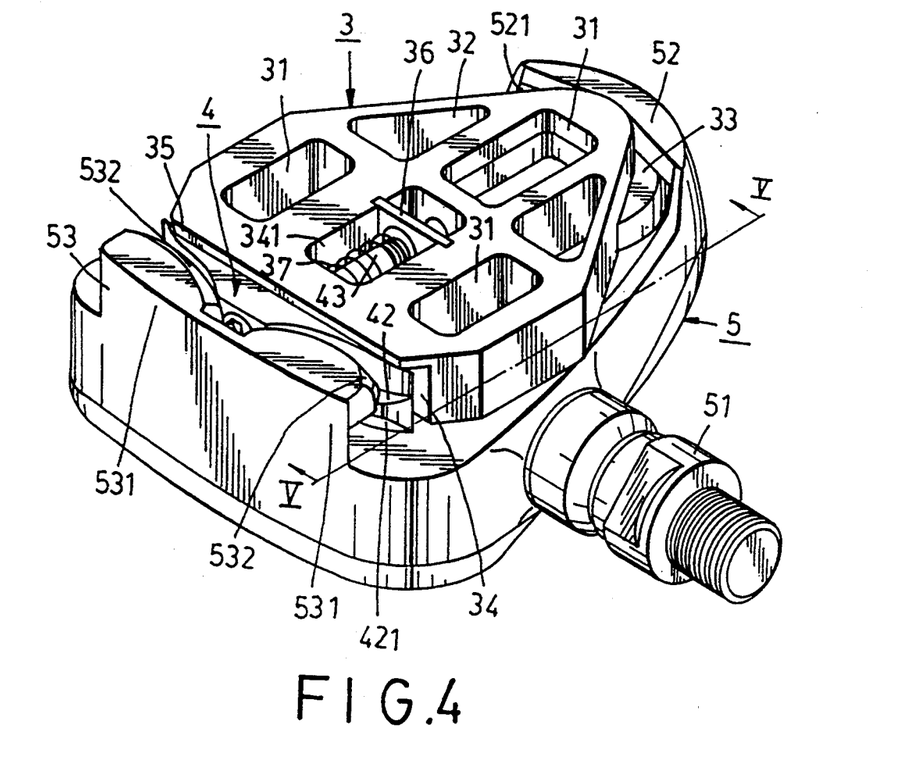
FIG. 4 is a schematic, perspective view of the pedal device of the present invention.
Figure 6:
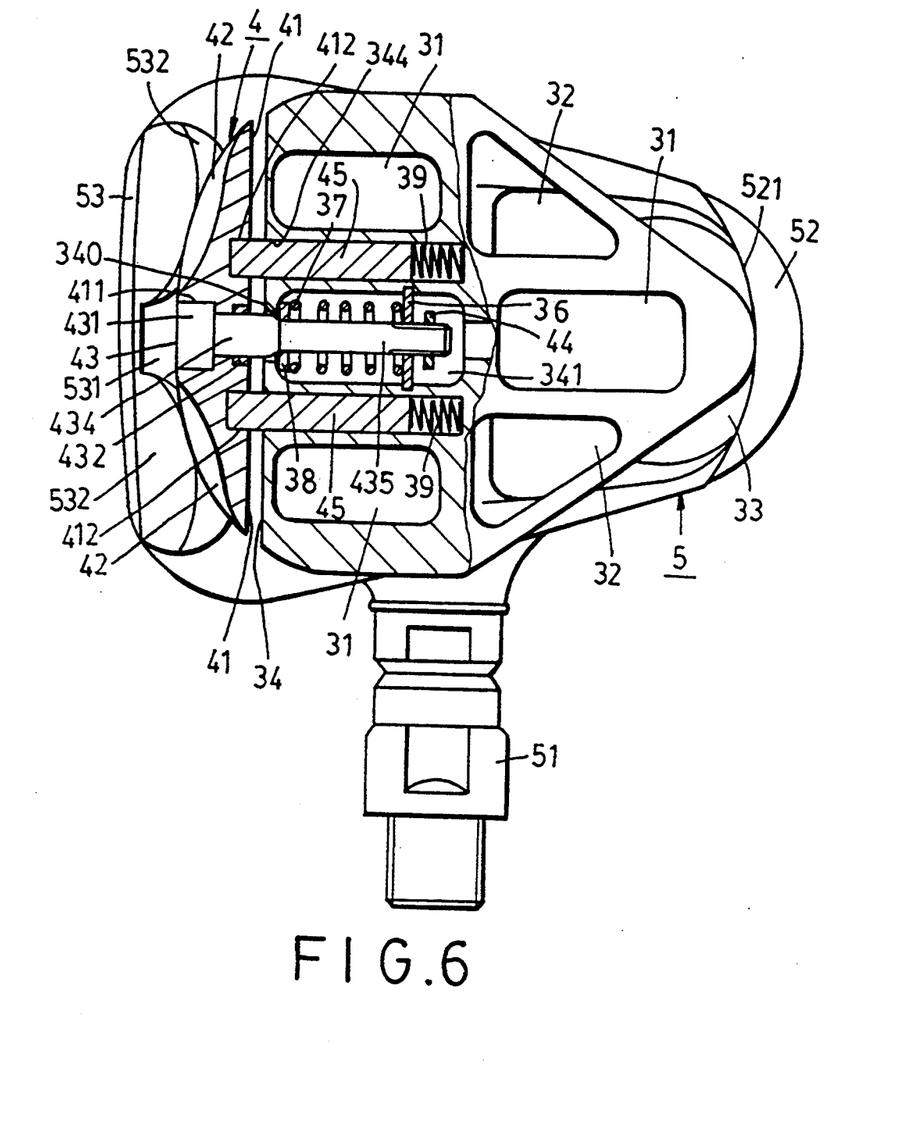
FIG. 6 is a partially cross-sectional view of the pedal device of FIG. 4, illustrating a condition wherein the cleat is being compressed into the pedal body.
Figure 7:
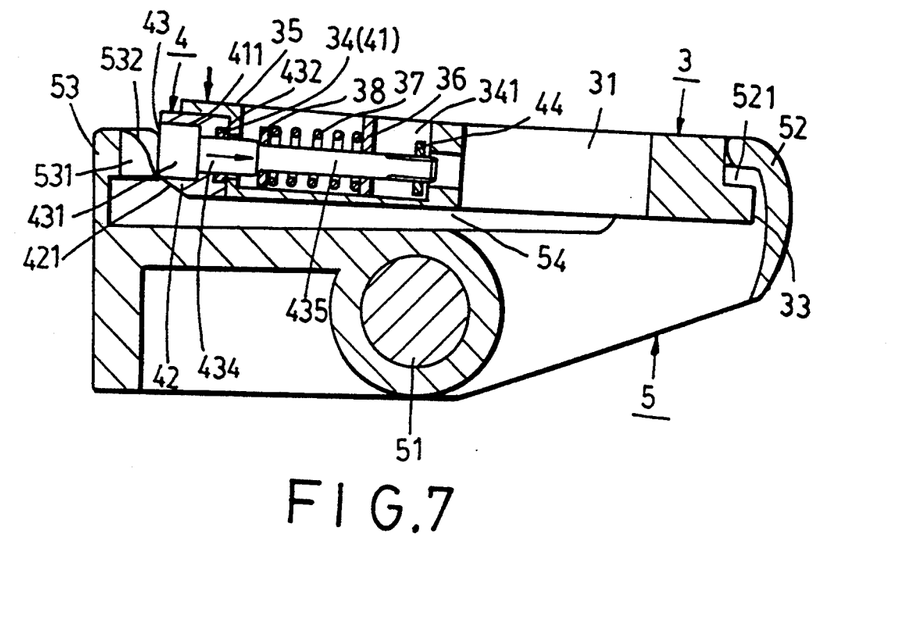
FIG. 7 is a partially cross-sectional side view of the pedal device, illustrating the cleat when partially engaged in the pedal body of the pedal device.

In use, the combined cleat 10 is screwed to the shoe of a cyclist and the curved insert piece 33 at the front part 3 is then inserted into the claw 52 of the pedal body 5. The rear part 4 of the combined cleat 10 is compressed downward against the inclined face 532 of the pedal body 5, wherein the rear part 4 moves toward the first part 3 against biasing action of the spring-biased cylinders 45, 39 so that the predetermined gap is narrowed, as shown in FIGS. 6 and 7. It is important to note that the combined cleat 10 is not engaged in the pedal body 5 at this stage. The combined cleat 10 is compressed downward further, wherein the curved flanges 42 of the rear part 4 slide over the inclined face 532 of the retaining jaw members 531 against a combined biasing action of the compression spring 37 and the spring-biased cylinders 39, 45 and then engage the curved groove 536, as shown in FIGS. 3 and 4. Under such condition, when the rear part 4 is moved laterally in a direction away from the conventional pedal shaft, the rear part 4 must overcome a two-step biasing action of the spring-biased cylinders 39, 45 and the compression spring 37 thus resulting in the need for a greater twisting force to disengage from the curved groove 536.

While a preferred embodiment has been described and explained, it will be apparent that many changes and modifications can be made in the general construction and arrangement of the present invention without departing from the scope and spirit thereof. Therefore it is desired that the present invention is not limited to the exact disclosure but only to the extent of the appended claims.

I claim:

1. A pedal device including a cleat to be fixed to a shoe sole and having a front portion provided with an insert piece, a rear portion opposite to said front portion, and a pedal body to be mounted rotatably on a conventional pedal shaft, said pedal body having a claw portion to receive releasably said insert piece of said cleat and an upright support spaced from said claw portion to engage said rear portion of said cleat, said pedal body being characterized by:

said cleat including a front part with said front portion and a rear part with said rear portion separated from said front part, said front part having a rearward flat abutting face spaced from said front portion, a bottom surface for abutting said pedal body, an upper surface opposite to said bottom surface and formed with a recess therein, a first blind bore with a predetermined depth extending centrally from said rearward flat abutting face toward said front portion of said front part and passing through said recess, and a pair of second blind bores extending from said rearward flat abutting face parallel to said first blind bore and being disposed on two sides of said first blind bore, each of said second blind bores having a depth that is shallower than said predetermined depth of said first blind bore, a partition wall disposed in said recess and dividing said recess into a front chamber adjacent to said front portion and a rear chamber, said partition wall having a central opening aligned with said first blind bore, said front chamber receiving a threaded nut therein and said rear chamber receiving a compression spring therein, said pair of second blind bores respectively receiving a spring-biased cylinder therein; and said rear part having a frontward flat abutting face spaced from said rear portion and facing said rearward flat abutting face of said front part, said rear portion of said rear part being provided with a wedge-shaped protrusion and further having a central through-hole therein, passing through said frontward flat abutting face and said wedge-shaped protrusion and aligned with said first blind bore, and a pair of receiving grooves formed in said frontward flat abutting face of said rear part on both sides of said central through-hole and respectively aligned with said second blind bores so as to receive a respective one of said spring-biased cylinders, said central through-hole of said rear part being constricted in said wedge-shaped protrusion to receive an enlarged head of a locking bolt which passes therethrough and which extends through said central opening of said partition wall to engage threadedly said threaded nut, interconnecting resiliently said front and rear parts and disposing said flat abutting faces of said front and rear parts apart from each other by biasing action of said spring-biased cylinders, said locking bolt including a first section which is formed integrally with said enlarged head and which has a cross section extensible into said first blind bore so as to compress said compression spring and a second section extensible through said compression spring;

whereby, when said insert piece of said front portion is inserted into said claw portion of said pedal body and said wedge-shaped protrusion of said rear part is compressed downward against said upright support of said pedal body, said rear part moves against biasing action of said spring-biased cylinders and said compression spring so that said frontward flat abutting face of said rear part collides with said rearward flat abutting face of said front part, thereby permitting said wedge-shaped protrusion to engage said upright support of said pedal body.

2. The pedal device as defined in claim 1, wherein said rear part further has two curved flanges formed symmetrically on two sides of said wedge-shaped protrusion adjacent to a lowermost portion of said rear part, said pedal body including a flat receiving surface formed between said upright support and said claw portion, and a pair of retaining jaws disposed on two sides of said upright support, each of said retaining jaws having an upright section extending upwardly from said flat receiving surface and a projection extending from said upright section and oriented substantially toward said claw portion, said projection having a downwardly inclined face extending from a topmost section thereof to said flat receiving surface, said projections, said upright sections and said flat receiving surface cooperatively defining a curved groove to receive said curved flanges of said rear part.

3. The pedal device as defined in claim 1, wherein said enlarged head of said locking bolt is flush with said wedge-shaped protrusion.

4. The pedal device as defined in claim 1, further comprising a washer ring disposed in said rear chamber and sleeved around said second section of said locking bolt so as to be biased by said compression spring when said compression spring is compressed by said first section of said locking bolt.

* * * * *